M. M. McINTYRE.
VEHICLE SPRING.
APPLICATION FILED MAY 7, 1915.
1,298,748.
Patented Apr. 1, 1919.
2 SHEETS—SHEET 1.
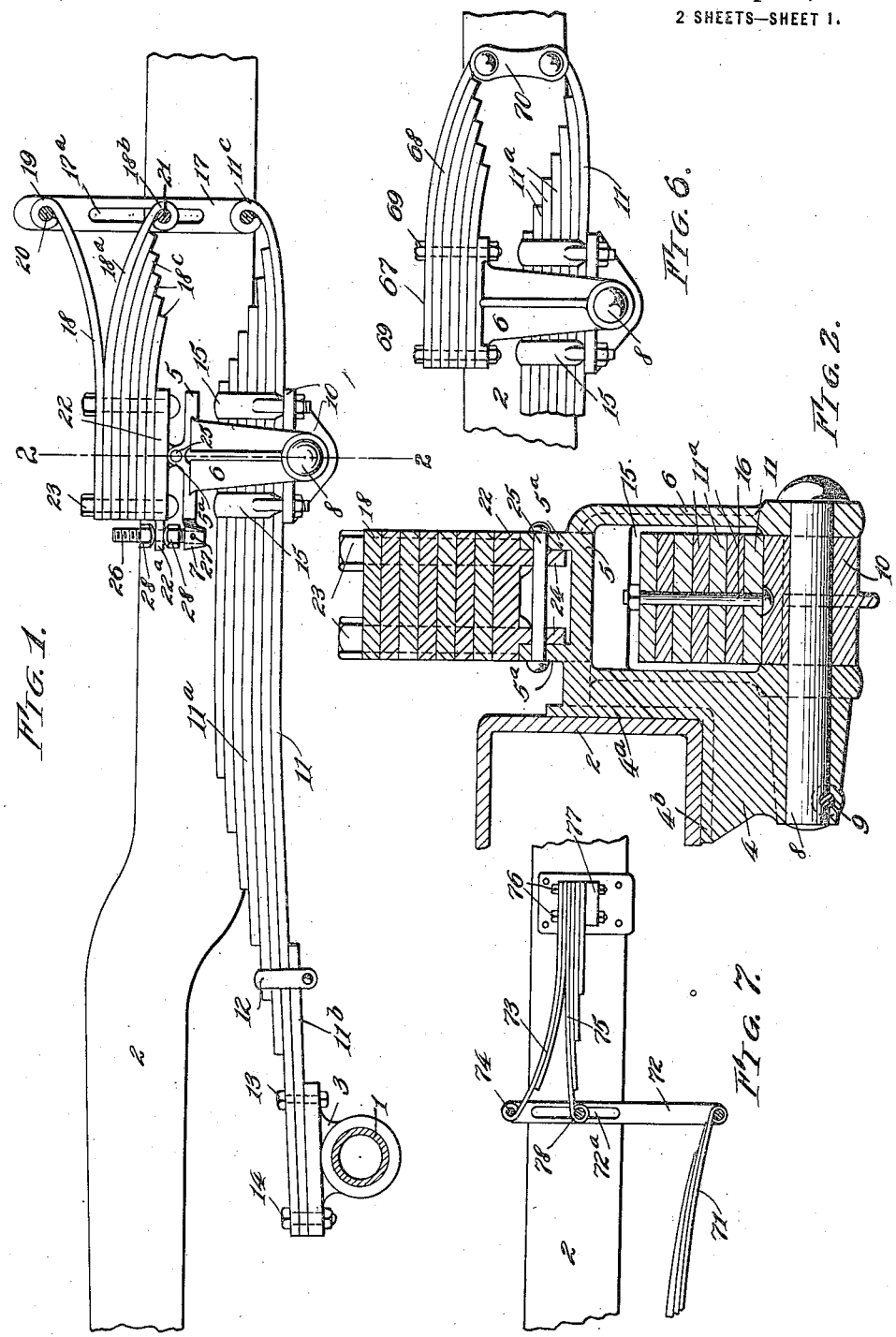
INVENTOR,
Michael M. McIntyre,
BY Hull & Smith
ATT'YS.

M. M. McINTYRE.
VEHICLE SPRING.
APPLICATION FILED MAY 7, 1915.
1,298,748.
Patented Apr. 1, 1919.
2 SHEETS—SHEET 2.
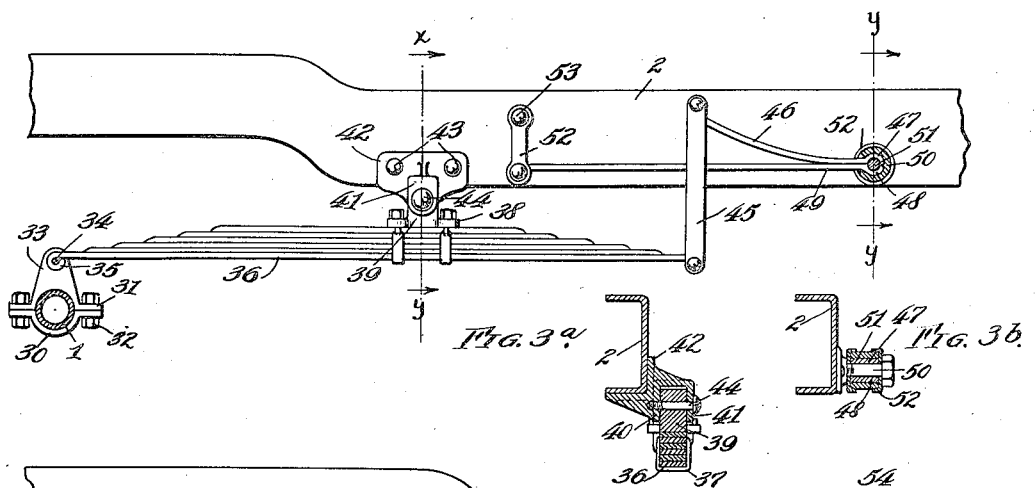
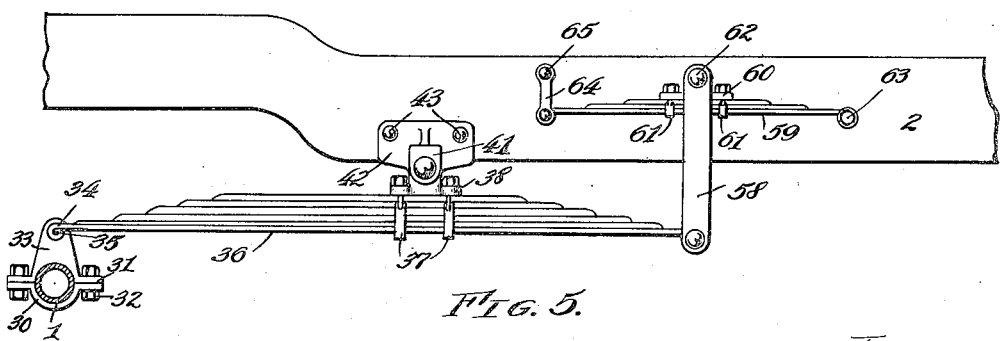
INVENTOR,
Michael M. McIntyre,
By Hull & Smith,
Att'ys.

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,298,748.

Specification of Letters Patent.

Patented Apr. 1, 1919.

Application filed May 7, 1915. Serial No. 26,492.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs, and more particularly to cantaliver springs wherein one end of the spring is connected to the axle, an intermediate portion of the spring is pivotally connected to a suitable portion of the body frame and the opposite end is also connected to said frame. The object of the invention is to improve the manner of connecting said springs to the coöperating parts whereby the action of the springs may be maintained substantially uniform under widely varying conditions of load and whereby the riding qualities of such springs will be greatly improved. A further object of the invention is to improve the driving connections through the spring, between the axle and the vehicle body. A still further object of the invention is to provide an improved construction of spring whereby the riding qualities generally will be enhanced. Further and more limited objects of the invention will appear hereinafter and will be realized in and through the combinations of elements embodied in the claims hereto annnexed and forming part hereof.

Referring to the drawings, Figure 1 represents a side elevation, with certain parts shown in section, of a spring assembly constructed in accordance with my invention, the spring being shown as connected to the axle and the portion of a side sill of a vehicle frame; Fig. 2 represents an enlarged sectional detail corresponding to the line 2—2 of Fig. 1; Figs. 3, 4 and 5 are views similar to Fig. 1 of modifications shown in the first mentioned figure; Fig. 3ª a sectional detail corresponding to the line *x—y* of Fig. 3; Fig. 3ᵇ a sectional detail corresponding to the line *y—y* of Fig. 3; Fig. 6 is a partial side elevation of a still further modified form of spring assembly; and Fig. 7 is a view similar to Fig. 6 showing one end of the main spring connected to a form of auxiliary spring similar to that which is illustrated in Fig. 1 but extending in the reverse direction from the auxiliary spring in the former figure, the auxiliary spring in Fig. 7 being rigidly supported by the side frame.

Describing by reference characters the various parts illustrated herein and with particular reference to Figs. 1 and 2, 1 denotes the rear axle housing of an automobile and 2 one of the side sills or frames of an automobile; 3 denotes a spring seat which is carried by a suitable part of the rear axle assembly. (This seat may be rotatably mounted upon the axle, as is the case with the spring seat shown, described and claimed in my application No. 828,694, filed April 1, 1914). 4 denotes generally a bracket which is secured to the frame 2. This bracket is generally angular in shape whereby a vertical branch 4ª and horizontal branch 4ᵇ are provided, enabling it to be conveniently secured to the web and the bottom flange of the side sill. This bracket is provided with a horizontal outwardly extending branch 5 and a vertical branch 6 extending substantially parallel with the branch 4ª and forming therewith an inverted U-shaped yoke. The horizontal branch 5 is provided with a pair of upwardly extending lugs 5ª, and said horizontal branch is extended beyond the branch 6 in order to provide a seat 7, for a purpose to be described hereinafter. The branch 6 and the branch 4ᵇ of the bracket are bored for the reception of a bolt 8, which may be secured in place by means of a pin 9. This bolt provides a bearing for the spring seat 10, which is rotatably mounted upon said bolt.

11 denotes the main plate of the spring, 11ª the auxiliary plates thereabove, and 11ᵇ an auxiliary plate therebelow. Assuming that the axle 1 is a rear axle the plate 11ᵇ underlies the rear portion of the main plate 11 and extends forwardly from the rear end of such plate to a point where it is overlapped by said main plate and two auxiliary plates thereabove, being secured to said main plate and auxiliary plates by means of a clip 12. The rear end of the spring is shown as connected to the spring seat 3 by means of a bolt 13 at the front end of the spring seat and extending through the plates 11 and 11ᵇ and to the rear end of the spring seat by means of a bolt 14 which extends through the seat and through the said plates. The body of the spring is connected to the spring seat 10 by means of clips 15, and a center bolt 16 may also be employed for the purpose of centering the plates and preventing longitudinal movement therebetween. The front end of the spring is shown as extending but a short distance beyond the seat 10. The main plate extends beyond the plates thereabove and is provided with an eye 11$^c$ whereby it is connected to the lower ends of a pair of shackle links 17 the upper ends whereof are carried by the front end of an auxiliary spring which is adjustably mounted upon a pivotal support carried by the side sill 2. This auxiliary spring is itself of novel construction and comprises an upper plate 18 the end whereof extends upwardly and is provided with an eye 19 to which the upper ends of the shackle links 17 are connected by the usual shackle bolt 20. Below the plate 18 and diverging downwardly therefrom and forming a V shaped space therewith is a plate 18$^a$ having an eye 18$^b$ which has a lost-motion connection with the shackle links 17 through a shackle bolt 21 that extends through said eye and through an elongated slot 17$^a$ in each of said links. 18$^c$ denote other plates, below the plate 18$^b$, which also extend downwardly at their forward ends. The body of the auxiliary spring is connected to a plate or seat 22 by means of bolts 23. This seat is provided with a pair of downwardly extending lugs 24 which are adapted to register with the lugs 5$^a$ and to which they may be pivotally connected by means of the bolt 25.

The rear end of the seat 22 is extended, as shown at 22$^a$, and this extension overhangs the extension 7 of the top branch 5 of the bracket 4. This bracket extension 7 is provided with a bore for the reception of a threaded bolt 26, which may be pinned to said extension, as indicated at 27. The bolt extends through an aperture in the extension 22$^a$ and is provided with nuts 28 located above and below such extension, affording means whereby the spring seat 22 may be adjusted about its pivot bolt 25.

In operation, the vehicle will be driven from the rear axle through the spring— where the spring is used as a rear spring— and sufficient metal will be present at the end of the spring to enable it to take such drive without unduly endangering the spring. When the axle 1 is moved upwardly, as by the wheel thereon encountering an obstruction, the spring will be rocked upon the bolt or pin 8, but the auxiliary spring to which the front of the main spring is connected will cushion and soften the blow transmitted to the frame, the auxiliary spring acting as a shock absorber to gradually absorb and break this blow. The shock absorbing action will be greatly enhanced by the particular construction of the auxiliary spring. As the front end of the main spring descends, the plate 18 yields freely, but increases its bearing upon the plate 18$^a$; the shackle links descend, resisted only by the gradually increasing resistance of the plate 18 until such time as the bolt 21 engages the upper ends of the slots 17$^a$, whereupon the plates 18$^c$ come successively into action to completely and gradually absorb and cushion the blow. The adjustable connection between the spring seat 22 and the frame—through the top plate 5 of the bracket—enables me to secure certain adjustments which are of great importance for great variations in the weight carried by the main spring as well as for any inequalities that may exist in the heights of the opposed side frames of the vehicle. By rocking either of the auxiliary springs in such manner as to elevate its front end, the front end of the main spring will be correspondingly elevated, thereby elevating the rear end of the frame. This adjustment of the auxiliary spring will, of course, be accomplished by suitably adjusting the nuts 28. On the other hand, an adjustment of the auxiliary spring in the reverse direction will be accompanied by a reverse movement of the frame with reference to the rear axle. This provides a particularly convenient construction and arrangement whereby the distance between the vehicle frame and axle may be adjusted to compensate for varying loads. For instance, it is quite common to employ a body of the "run-about" or two-passenger type for winter and to replace this with a heavier or five-passenger body in summer. With the former type of body, the rear springs will be subjected to a comparatively light load while, with the latter construction of body, the said springs will be subjected to a much greater load, due not only to the body itself but to the additional passengers which it is adapted to carry above and upon the springs.

It will be noted that the front portion of the main spring is very short compared with the rear portion thereof. This shortening of the front of the spring and consequent saving of material may be accomplished without any sacrifice of resiliency or shock absorbing qualities, because of the peculiar construction of the auxiliary spring and the manner of connecting the same to the front of the main spring. Furthermore, the shortening of the front of the spring correspondingly shortens the front arm of the lever and thus provides a quicker adjustment of the frame.

Certain features herein shown are disclosed and claimed more broadly in my application No. 855,848, filed August 8, 1914.

In Fig. 3 there is shown a modification of my invention wherein the cantaliver spring is of a more usual construction, the front end thereof being yieldingly supported by an auxiliary spring which is adapted to cushion and absorb the load and shocks transmitted to the front end of the spring and thence to the vehicle body. In this view, 1 denotes the rear axle housing and 30 the lower and 31 the upper member of a two-part clamp secured thereto by means of bolts 32. The upper member of this clamp carries a pair of upwardly extending lugs or ears 33 which support therebetween the bolt or pin 34 for the eye 35 of the main plate 36, said main plate comprising part of a cantaliver spring the body portion whereof is secured by clips 37 to a plate 38 having a projection 39 which extends between the lugs 40, 41 of a bracket the base 42 whereof is riveted or otherwise suitably secured to the side sill 2, as indicated at 43. The central or body portion of the main spring is pivotally connected to this bracket by means of a bolt 44 extending through the parts 39, 41.

The front end of the main spring is pivotally connected to a pair of long shackle links 45 the upper ends whereof are pivotally connected to a curved spring plate 46 the front end whereof is provided with a half eye 47 which coöperates with a half eye 48 on the corresponding end of a substantially horizontal spring plate 49 to form a complete eye, the half eyes being held in operative relation to each other by means of the bolt 50, the segmental sleeve 51, and the cap or head 52 for the outer end of the bolt. The rear end of the spring plate 49 is connected to the lower ends of a pair of shackle links 52 which are pivotally supported from the side sill 2 by means of the bolt 53. It will be evident that any movement of the axle or of the vehicle body 1 tending to depress the front end of the spring plate 36 will cause the plate 46 to gradually elongate and cushion upon the plate 49, which plate, because of the shackle suspension for its rear end, is permitted to flex downwardly under the pressure or load transmitted thereto from the plate 46.

In Fig. 4 there is shown a further modification of the invention which, so far as the manner of connecting the main spring to the axle and to the vehicle frame is concerned, is identical with Fig. 3; accordingly the main spring and its connections with the vehicle frame and axle are given the same reference characters that are applied to the corresponding parts in Fig. 3. The auxiliary spring in this case comprises two plates 46$^a$ which are similar to the single plate 46 of Fig. 3 and the ends whereof are connected to the ends of the spring plate 49 in the same manner as shown for the end of the plate 46 in Figs. 3$^a$ and 3$^b$. The ends of the plates 46$^a$ are connected each by a pair of shackle links 54 with the upper pin 55 of a pair of shackle links 56 the lower ends whereof are connected to the main plate of the main spring by the bolt or pin 57. The action of this auxiliary spring will be quite similar to that of the springs 46 and 49 of Fig. 3, any blow or load tending to depress the front end of the main spring pulling down upon the uplifted ends of the plates 46$^a$ and causing these plates to cushion and elongate upon the plate 49. This plate, however, is not free to flex to any material extent because of the more or less rigid connection with the frame 2.

In Fig. 5 there is shown a further modification of my invention wherein the main spring and the axle and frame connections are identical with those shown in Figs. 3 and 4, and the corresponding parts are designated by the same numerals that appear upon the two preceding figures. The front end of the main spring in this case is connected by means of a pair of long shackle links 58 with the central portion of a flat spring 59. This connection may be conveniently made through a plate 60 to which the clips 61 are connected, which plate is provided with a suitable lug for the reception of a shackle bolt 62. The front end of the auxiliary spring 59 is connected to a bolt or pin 63 on the side sill 2 while the rear end is flexibly connected to the frame by means of a pair of shackle links 64 connected to and supported by inner bolts 65 projecting from the side frame. In this case, when the front end of the main spring is depressed or the distance between such end and the side sill 2 tends to increase, this movement is yieldingly cushioned by the spring 59, but there is no cushioning of one member of such auxiliary spring upon the other. Because of the manner of supporting the spring 59, however, a yielding resistance is opposed to this relative movement between the front end of the main spring and the vehicle frame, which resistance gradually increases.

In Fig. 6 there is shown a modification of the invention which is similar to that shown in Fig. 1 as to the front end of the main spring and the manner of connecting the same to a vehicle frame. The parts of the main spring and the bracket connection between the same and the side sill are therefore identified by the same reference characters that appear on the corresponding parts of Fig. 1. The auxiliary spring in this case is substantially identical with the lower section of the auxiliary spring shown in Fig. 1 and comprises an upper main plate 67 and a series of shorter plates 68, said plates being connected to the top of the bracket 6 by means of bolts 69. The auxiliary spring is connected to the end of the main plate 11 of the main spring by means of shackle links 70.

In Fig. 7 there is shown a still further modification of my invention wherein the front end 71 of the main spring which may be a cantaliver spring of the type shown in Figs. 3 to 5—is connected by a pair of shackle links 72 to the upper member 73 of the auxiliary spring by means of the ordinary shackle pin or bolt 74. This upper member of the auxiliary spring is curved upwardly at its rear end and forms a V-shaped space with the upper plate of the lower member 75. The body portions of the two members 73 and 75 are connected together by bolts 76, which bolts also serve to connect the auxiliary spring to the side frame 2 by means of a seat or bracket 77 which is riveted or otherwise secured to said side frame. The lower member or fork of the auxiliary spring has a lost-motion connection with the links 72 by means of slots 72ª in said links and a pin or bolt 78 extending through the eye of the lower spring member and through said slots. The operation of the auxiliary spring shown in this figure is similar to that of the auxiliary spring shown in Fig. 1 except for the fact that there is no rotary adjustment of the seat for the auxiliary spring. Relative movement tending to separate the side sill 2 and the front end of the cantaliver spring will cause the upper spring section 73 to elongate and cushion upon the lower section 75 and will cause this section to be brought into action when the pin or bolt 78 engages the upper ends of the slots 72ª.

While I have necessarily described my invention at considerable length and in considerable detail, I do not thereby propose to be limited to any specific details except as the same may be positively included in the claims hereto annexed or their inclusion may be rendered necessary by the state of the prior art. For instance, for convenience of description, the axle 1 is assumed to be the rear axle, and the terms "front" and "rear" have been applied hereinbefore and will be applied hereinafter to corresponding portions of the main and auxiliary springs. I do not, however, thereby propose to limit my invention only to rear springs to exclude it from use with front springs, the ends whereof are arranged reversely to the ends of rear springs.

Having thus described my invention, what I claim is:—

1. The combination, with a vehicle frame and axle, of a spring comprising a main plate, a plate beneath one end portion of the main plate, and a plurality of auxiliary plates above the main plate, the plate beneath the main plate being of such length as to be overlapped by a plurality of auxiliary plates, means pivotally connecting the body of said spring to the frame, and means connecting longitudinally-spaced portions of the main plate and the plate therebeneath to the axle.

2. The combination, with a vehicle frame and axle, of a spring comprising a main plate, an auxiliary plate at one side of the main plate and a plurality of auxiliary plates at the other side of the main plate, the first mentioned auxiliary plate being of such length as to be overlapped by one of the other auxiliary plates, means pivotally connecting the body of said spring to the frame, and means connecting longitudinally spaced portions of the main plate and the first mentioned auxiliary plate to the axle.

3. The combination, with a vehicle body frame and axle, of a spring comprising a main plate, a plurality of auxiliary plates on one side thereof and an auxiliary plate on the opposite side of the main plate and extending from one end of the main plate to a position where it is overlapped by a plurality of the other auxiliary plates, means connecting such overlapped end of the last mentioned auxiliary plate with the overlapping plates, a spring seat on said axle, longitudinally spaced connections between the main plate and the last mentioned auxiliary plate and said spring seat, and a pivotal connection between the body of the spring and the frame.

4. The combination, with a vehicle body frame and axle, of a spring comprising a main plate, a plurality of auxiliary plates on one side thereof and an auxiliary plate on the opposite side thereof and extending from one end of the main plate to a position where it is overlapped by a plurality of the first mentioned auxiliary plates, means connecting such auxiliary plates with the overlapped end of the last mentioned auxiliary plate, a spring seat on the axle having a pair of longitudinally spaced connecting portions, means connecting the ends of the main plate and the auxiliary plate therebeneath with one of such portions of the seat, means connecting the main plate and the plate therebeneath to the other portion of the spring seat, and a pivotal connection between the body of the main spring and the frame.

5. The combination, with a vehicle frame and axle, of a spring connected at one end to the axle and pivotally connected to the frame, a second spring pivotally connected to the frame above the first mentioned spring and having an end extending in substantially the same direction as the other end of the first spring, means connecting such corresponding ends of said springs, and means whereby the second spring may be adjusted with reference to its pivot.

6. The combination, with a vehicle frame and axle, of a spring connected at one end to the axle and pivotally connected intermediate of its ends to the frame, a second spring pivotally connected to the frame above the pivotal connection for the first mentioned spring and extending in substantially the same direction from its pivotal connection as the other end of the first spring, means connecting such extending portions of said springs, and means whereby the second spring may be adjusted with reference to its pivot.

7. The combination, with a vehicle side frame and axle, of a spring having a driving connection between one end thereof and the axle and having an intermediate portion pivotally connected to the frame and a second end portion projecting beyond such pivotal connection, an auxiliary spring connected to the frame and located above the first-mentioned spring and having an end extending substantially parallel with the second end of the first-mentioned spring, and means flexibly connecting the corresponding ends of said springs.

8. The combination, with a vehicle frame and axle, of a spring connected at one end to the axle and having an intermediate portion pivotally connected to the frame and a second end portion extending beyond such pivotal connection, an auxiliary spring having an end adjacent to the second end of the first mentioned spring and comprising a main plate and an auxiliary plate, links connecting the main plate of the auxiliary spring with the corresponding portion of the said main plate of the auxiliary spring, there being a substantially V-shaped space provided between the main plate of the auxiliary spring and the next adjacent plate whereby said main plate may gradually cushion upon the next plate as it is deflected by the main spring.

9. The combination, with a vehicle frame and axle, of a spring connected at one end to the axle and having an intermediate portion pivotally connected to the frame with a second end portion extending beyond such pivotal connection, and an auxiliary spring connected to the frame and comprising a pair of diverging plates one of which extends in proximity to and is connected with the end of the second portion of the main spring.

10. The combination, with a vehicle frame and axle, of a spring connected at one end to the axle and having an intermediate portion pivotally connected to the frame with a second end portion extending beyond such pivotal connection, an auxiliary spring connected to the frame and comprising a pair of diverging plates extending in proximity to the end of the second portion of the main spring, a connection between one of said plates and the second end portion of the main spring, and a lost-motion connection between the other plate of the auxiliary spring and such portion of the main spring.

11. The combination, with a vehicle frame and axle, of a spring connected at one end to the axle and having an intermediate portion pivotally connected to the frame with a second end portion extending beyond such pivotal connection, an auxiliary spring connected to the frame and comprising a pair of diverging plates extending above the end of the second portion of the main spring, means connecting one of said plates to the last mentioned end of the main spring, and a lost motion connection between the other plate and said end of the main spring.

12. The combination, with a vehicle frame and axle, of a spring connected at one end to the axle and having an intermediate portion pivotally connected to the frame with a second end portion extending beyond such pivotal connection, an auxiliary spring connected to the frame and comprising a pair of diverging plates extending above the end of the second portion of the main spring, shackle links connecting one of said plates and the last mentioned end of the main spring, said links having slots therein, a pin in said slots and connected to the other plate, and supplemental plates additional to the last mentioned plate and adapted to come into play successively after the pin shall have engaged the ends of the slots.

13. The combination, with a vehicle frame and axle, of a spring connected at one end to the axle, a pivotal connection between the intermediate portion of the spring and the frame, an auxiliary spring pivotally supported by the frame above the pivotal connection and extending therefrom in substantially the same direction as the end of the main spring which is opposite the axle, means for connecting the end of the auxiliary spring with the last mentioned end of the main spring, and means whereby the auxiliary spring may be adjusted with respect to its pivot.

14. The combination, with a vehicle frame and axle, of a spring connected at one end to the axle, a bracket connected to the frame, a pivotal connection between the body portion of said spring and said bracket, a spring seat pivotally connected to said bracket, an auxiliary spring having its body connected to said spring seat and extending above and substantially parallel with the end of the main spring which is opposite the axle, means connecting the end of the auxiliary spring with the subjacent end of the main spring, and means coöperating with said seat and bracket for adjusting the spring seat with reference to its pivot.

15. The combination, with a vehicle frame and axle, of a spring connected at one end to the axle, a bracket connected to the frame, a pivotal connection between the body portion of said spring and said bracket, a spring seat pivoted to said bracket, an auxiliary spring having its body connected to said spring seat and extending above and substantially parallel with the end of the main spring which is opposite the axle, means connecting the end of the auxiliary spring with the subjacent end of the main spring, and means coöperating with said seat and bracket for adjusting the spring seat with reference to its pivot.

16. The combination, with a vehicle frame and axle, of a spring connected at one end to the axle, a bracket connected to the frame, a pivotal connection between the body portion of said spring and said bracket, a spring seat pivotally supported by the frame, an auxiliary spring having its body connected to said spring seat and extending substantially parallel with the end of the main spring which is opposite the axle, means connecting the end of the auxiliary spring with the adjacent end of the main spring, and means for adjusting the spring seat with reference to its pivot.

17. The combination, with a vehicle frame and axle, of a spring connected at one end to the axle, a pivotal connection between the body portion of said spring and said frame, an auxiliary spring having its body pivotally supported by the frame, means connecting the end of the auxiliary spring with the adjacent end of the main spring, and means for adjusting the auxiliary spring with reference to its pivot.

18. The combination, with a vehicle frame and axle, of a spring connected at one end to the axle and having an intermediate portion pivotally connected to the frame with a second end portion extending beyond such pivotal connection, an auxiliary spring connected to the frame and comprising a pair of diverging plates extending in proximity and in substantially parallel relation to the second end portion of the main spring, shackle links connecting such end portion of the main spring with one of said plates, and a lost-motion connection between said shackle links and the other plate of the auxiliary spring.

19. The combination, with a vehicle frame and axle, of a spring connected at one end to the axle and having an intermediate portion pivotally connected to the frame with a second end portion extending beyond such pivotal connection, an auxiliary spring connected to the frame and comprising a pair of diverging plates extending above the end of the second portion of the main spring, shackle links connecting such end of the main spring with the uppermost diverging leaf of the auxiliary spring, said shackle links being provided with elongated slots in their sides, and a pin extending through an eye of the other leaf of the auxiliary spring and having its ends mounted in said slots.

20. The combination, with a vehicle frame and axle, of a spring connected at one end to the axle and having an intermediate portion pivotally connected to the frame with a second end portion extending beyond such pivotal connection, a pair of spring plates extending in proximity to and in substantially vertical relation to the second end portion of the main spring, means connecting such end portion of the main spring with one of said plates, and a lost-motion connection between said main spring and the other plate.

21. The combination, with a vehicle frame and axle, of a spring connected at one end to the axle and having an intermediate portion pivotally connected to the frame with a second end portion extending beyond such pivotal connection, a pair of leaves arranged one above the other and extending above the end of the second portion of the main spring, shackle links connecting such end of the main spring with the uppermost leaf, said shackle links being provided with elongated slots in their sides, and a pin extending through an eye of the other leaf and having its ends mounted in said slots.

22. The combination, with a vehicle frame and axle, of a spring comprising a main plate, an auxiliary plate at one side of the main plate and a plurality of auxiliary plates at the other side of the main plate, the first mentioned auxiliary plate extending from one end of said plate and being of such length as to be overlapped by one of the other auxiliary plates, means pivotally connecting the body of said spring to the frame, and means connecting the first mentioned auxiliary plate and the main plate to the axle.

23. The combination, with a vehicle frame and axle, of a main spring having one end connected to the axle, a pivotal connection between the body portion of the main spring and the vehicle frame, an auxiliary spring extending above and substantially parallel with the subjacent end portion of the main spring which is opposite the axle, a spring plate extending at an angle with respect to the auxiliary spring and adapted to elongate upon and be cushioned by such auxiliary spring, and connections between the diverging end of the spring plate and the end of the main spring therebeneath.

In testimony whereof, I hereunto affix my signature in the presence of two witnesses.

MICHAEL M. McINTYRE.

Witnesses:
 H. E. FIGGIE,
 W. O. KOHLER.